US011373235B2

(12) United States Patent
Manning

(10) Patent No.: US 11,373,235 B2
(45) Date of Patent: Jun. 28, 2022

(54) SYSTEMS AND METHODS FOR SCRIPTED CONTENT DELIVERY

(71) Applicant: JWL IP HOLDINGS, LLC, New York, NY (US)

(72) Inventor: Damian Franken Manning, New York, NY (US)

(73) Assignee: JWL IP HOLDINGS, LLC, New York, NY (US)

( * ) Notice: Subject to any disclaimer, the term of this patent is extended or adjusted under 35 U.S.C. 154(b) by 0 days.

(21) Appl. No.: 16/994,527

(22) Filed: Aug. 14, 2020

(65) Prior Publication Data

US 2021/0133857 A1 May 6, 2021

Related U.S. Application Data

(60) Continuation of application No. 16/197,425, filed on Nov. 21, 2018, now Pat. No. 10,783,571, which is a
(Continued)

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06F 21/554* (2013.01); *G06Q 20/123* (2013.01);
(Continued)

(58) Field of Classification Search
CPC ............. G06Q 30/0635; G06Q 20/123; G06Q 30/0603; G06Q 30/0633; G06Q 30/0641;
(Continued)

(56) References Cited

U.S. PATENT DOCUMENTS

2002/0072980 A1* 6/2002 Dutta ................. G06Q 30/0633
705/26.62
2002/0188516 A1* 12/2002 Farrow .............. G06Q 30/0641
705/27.1
(Continued)

OTHER PUBLICATIONS

CyberSource debuts new-generation on-demand commerce applications. (Sep. 22, 1998). PR Newswire Retrieved from http://search.proquest.com/docview/447244980?accountid=14753.*

*Primary Examiner* — Kathleen Palavecino
(74) *Attorney, Agent, or Firm* — Tanner IP, PLLC

(57) ABSTRACT

The present subject matter relates generally to systems and methods for adding interactive functionality to a website, other digital media objects, and computer processor applications. Systems and methods for adding functionality to content served by a first server, may include receiving, at a second server, a request from a client-computer for code to add purchase functionality to the content. The code may be sent to the client-computer based on the request. A further request may be received from the client-computer containing information about objects identified in the content as relating to the purchase functionality and a request for information about the objects. Information about the objects may be sent to the client-computer based on the further request. An instruction to complete the purchase may be received from the client-computer, and a confirmation of the completion of the purchase may be sent to the client-computer. The content may be an HTML document and the objects may be objects according to the HTML Document Object Model.

13 Claims, 3 Drawing Sheets

Related U.S. Application Data division of application No. 14/979,718, filed on Dec. 28, 2015, now Pat. No. 10,235,709, which is a continuation of application No. 12/821,554, filed on Jun. 23, 2010, now Pat. No. 9,245,263.

(60) Provisional application No. 61/219,537, filed on Jun. 23, 2009.

(51) Int. Cl.
| | |
|---|---|
| *G06F 21/55* | (2013.01) |
| *H04L 67/02* | (2022.01) |
| *G06Q 20/12* | (2012.01) |
| *H04L 67/104* | (2022.01) |
| *H04L 67/01* | (2022.01) |

(52) U.S. Cl.
CPC ..... *G06Q 30/0603* (2013.01); *G06Q 30/0633* (2013.01); *G06Q 30/0641* (2013.01); *H04L 67/02* (2013.01); *H04L 67/104* (2013.01); *H04L 67/42* (2013.01)

(58) Field of Classification Search
CPC ..... G06F 21/554; H04L 67/02; H04L 67/104; H04L 67/42
See application file for complete search history.

(56) References Cited

U.S. PATENT DOCUMENTS

| | | | |
|---|---|---|---|
| 2006/0184431 A1* | 8/2006 | Rosenberg | H04N 21/84 705/26.8 |
| 2007/0094100 A1* | 4/2007 | Hodson | G06Q 30/0633 705/26.5 |
| 2008/0004982 A1* | 1/2008 | Bezos | G06Q 20/04 705/26.81 |
| 2008/0103923 A1* | 5/2008 | Rieck | G06Q 30/0635 705/26.41 |
| 2008/0154738 A1* | 6/2008 | Jain | G06Q 30/08 705/14.73 |
| 2008/0183593 A1* | 7/2008 | Dierks | G06Q 30/0601 705/26.35 |
| 2008/0244509 A1* | 10/2008 | Buchs | G06F 8/36 717/106 |
| 2008/0275864 A1* | 11/2008 | Kim | G06F 16/9535 |
| 2008/0281968 A1* | 11/2008 | Rodriguez | H04N 21/47202 709/226 |
| 2009/0030794 A1* | 1/2009 | Scheflan | G06Q 30/0277 705/14.39 |
| 2010/0010908 A1* | 1/2010 | Pasupulati | G06Q 20/40 705/26.1 |

* cited by examiner

SYSTEMS AND METHODS FOR SCRIPTED CONTENT DELIVERY

This application is a continuation of U.S. Pat. No. 10,783,571 issued Sep. 22, 2020 and entitled "SYSTEMS AND METHODS FOR SCRIPTED CONTENT DELIVERY," which is a divisional application of U.S. Pat. No. 10,235,709, issued Mar. 19, 2019 and entitled "SYSTEMS AND METHODS FOR SCRIPTED CONTENT DELIVERY," which patent is a continuation application of U.S. Pat. No. 9,245,263 issued Jan. 26, 2016 and also entitled "SYSTEMS AND METHODS FOR SCRIPTED CONTENT DELIVERY," which patent claims priority to U.S. Provisional Application No. 61/219,537 filed Jun. 23, 2009 and also entitled "SYSTEMS AND METHODS FOR SCRIPTED CONTENT DELIVERY," the contents of all of which are hereby incorporated by reference in their entireties for all purposes.

BACKGROUND OF THE INVENTION

The present subject matter relates generally to systems and methods for adding interactive functionality to a website, other digital media objects, and computer processor applications.

Many websites offering items for sale implement a shopping cart. Visitors to the website can add an item to a shopping cart using a link or a button. The link or button is often placed next to an image of the item for sale. Once the visitor is finished selecting items to buy, he can check out and purchase the selected items by supplying payment and shipping information using a form on the website.

The payment information submitted will usually be in the form of credit card details. Information can also be in the form of a confirmation from a third party. For instance, the user can be redirected to a third party in order to supply payment information to that party. The third party will then send a reference confirming the payment on behalf of the user, confirming that payment has been received.

The shopping cart interface may be implemented as a server-side application on the web-server hosting the website with the shopping cart functionality. The server may have access to a database of items for sale, and it can keep track of each user visiting the site and what their shopping cart contains. In some implementations, each page sent back to the user contains a short overview of the contents of their shopping cart.

There are implementations of shopping cart functionality that do not rely on a server-side application that is running on the server hosting the website. These may rely on a second web-server implementing shopping cart functionality on behalf of the first one. For these applications, the pages on the first server may contain links enabling a visitor to add items to his shopping cart, view the contents of his shopping cart and to check out and purchase the items in the shopping cart. All these links may be static links to pages on the second server.

In one such implementation, the owner of a first website containing items for sale will register with a service provider who will provide shopping cart functionality. The owner of the first website may receive an account code and a code for each item for sale registered with the service provider.

Each link added on the first website to enable the shopping cart functionality may be a static link to a page hosted by the service provider. Each link may contain the account number. Each link to add an item to the shopping cart may contain the code for that item.

Each time a visitor clicks any of these static links on the first website he is taken to a page on the service provider's server, but is redirected back to the first website after completing the task. The form to check out and the page to view the contents of the shopping cart may be hosted from the service provider's servers.

SUMMARY OF THE INVENTION

When using an approach in which clicking on static links directs a user to a third party service provider's server, the user may see that they are being redirected to a different URL, and may at times receive a warning when being redirected between secure and non-secure websites. This behavior can raise concerns of inferior security and data protection with users, and can in turn lead to a reduction in sales.

Embodiments of the present invention can prevent this behavior and further enhance the shopping cart application, and other functionalities, without requiring such functionality to be on the server from which the website is hosted.

The present subject matter generally deals with the use of application programming interface (API) that can be included in a web-page, or other application, such that functionality is added to the application when it is presented to a requesting user. Embodiments may include methods for adding functionality to an automated application served by a first provider. For example, an application may be served by a first provider for presentation to a user at a client-side computing device. As part of the presentation of the application to the user, the application may request code from a second service provider. Generally, such methods may include receiving, at the second provider, a request from a client-computing device for code to add functionality to the application. The second provider may then send the code to the client-computing device. Additionally, the client-computing device may request additional information from the second provider, including information about objects identified in the application as relating to the functionality. The second provider may send such information about the objects to the client-computing device.

The above methodology can provide an efficient way for smaller service providers to present sophisticated content by using applications that automatically draw on code from the second service provider, which may be a service provider with specialized content development, special access, deeper resources, etc.

For ease of understanding, embodiments are described in which purchase functionality may be added. However, it should be understood that the invention is not limited to such implementations, and can provide functionality of various sorts to web-pages, digital media objects and other computerized applications.

Embodiments include methods for adding functionality to a computerized application, such as a web-page served by a first web-server. The methods may include receiving, at a second web-server, a request from a client-computer for code to add purchase functionality to the web-page, or other application. The second web-server may send the requested code to the client-computer. The second web-server may then receive a request from the client-computer containing information about objects identified in the web-page as relating to the purchase functionality and a request for information about the objects.

The second web-server may send information about the objects to the client-computer. The second web-server may receive an instruction to complete the purchase from the client-computer, and send a confirmation of the completion of the purchase to the client-computer.

Embodiments may also include wherein the web-page is an HTML document and the objects are objects according to the HTML Document Object Model.

Embodiments may also include sending a request to the client-computer for a delivery address when at least one of the items to be purchased indicates physical delivery, and/or sending a hyperlink to the address where the hem can be downloaded to the client-computer when at least one of the hems to be purchased indicates on-line delivery. Depending on whether the items to be purchased are virtual or physical, the consumer may supply information sufficient for electronic or physical delivery. For instance, an e-mail address may be requested for a downloadable file, whereas a postal address may be required for physical delivery.

Aspects of the above features may provide expanded capabilities with respect to customizing content, such as e-commerce content, that is provided to a requesting user from the second web-server. For example, embodiments may include determining product pricing, product availability, and/or instructions at the second web-server based on a first web-server identity, a first web-server API key, a first web-server URL, and/or a first web-server domain.

Embodiments may include determining product pricing, product availability, and/or instructions at the second web-server based on, for example, a consumer location, a website that referred a user to first web-server, items already in a shopping cart of the web-page, and/or the presence of a particular cookie in a web browser that is displaying the web-page.

Embodiments may include determining product pricing, product availability, and/or instructions at the second web-server based on, for example, a consumer identity, a membership level of a requesting user, and/or a purchase history of a requesting user.

Embodiments may include identifying a mobile device product in a shopping cart for the web-page, and automatically requesting a phone number and a carrier to deliver content over the air.

Embodiments may include wherein the code includes at least one of audio preview functionality and video preview functionality.

Embodiments may include wherein an item purchased by a consumer is a downloadable item that is not currently available. In such embodiments, the method may also include providing an authorization code to allow downloading of the item when it becomes available, and/or automatically sending the consumer an electronic message when the item becomes available for downloading.

Further advantages of the present subject matter will become apparent to those of ordinary skill in the art upon reading and understanding the following detailed description of the preferred embodiments.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the present subject matter relate to adding functionality to computerized applications, such as, for example, implementing online purchase functionality on a website. The website may be hosted on a server which does not implement online purchase functionality. A user may visit the website and complete a purchase without leaving the website or being redirected by clicking links to a different server.

A web-server can serve web-pages to visitors. The web-pages may include Hyper Text Markup Language (HTML), JavaScript, Cascading Style Sheet (CSS) and Extensible Markup Language (XML). A single file may contain a combination of these or only a single one.

Figure 1:
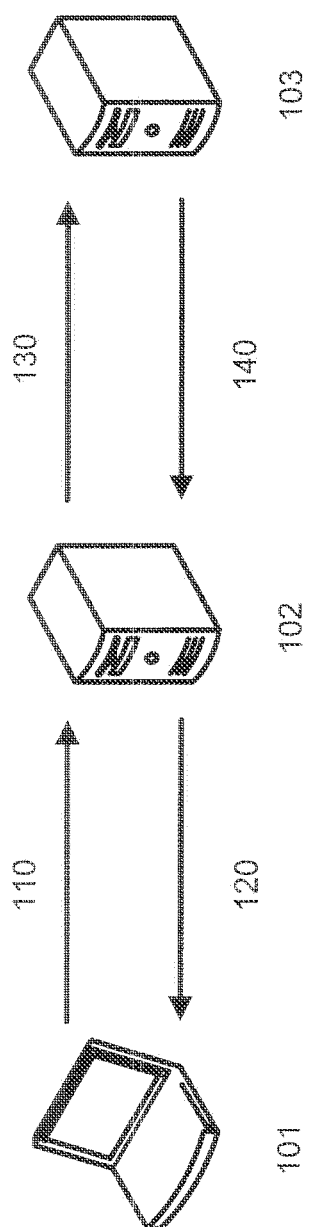
FIG. 1 depicts an exemplary network model.

For example, as depicted in FIG. 1, when a user is using a client-side computer 101 to visit a website hosted on server 102, the web-server 102 typically sends web-pages to a web browser running on computer 101, which displays them to the user. When a user sends a request 110 for a web-page to a web-server, the web-server may fetch content from a number of sources, such as requesting 130 and receiving 140 content from server 103, compile it into a single piece of data and send it to the user as a web-page in 120. The web-server may also fetch the content of a single file and send it unmodified to a user. Such a web-page is known as a static web-page.

Figure 2:
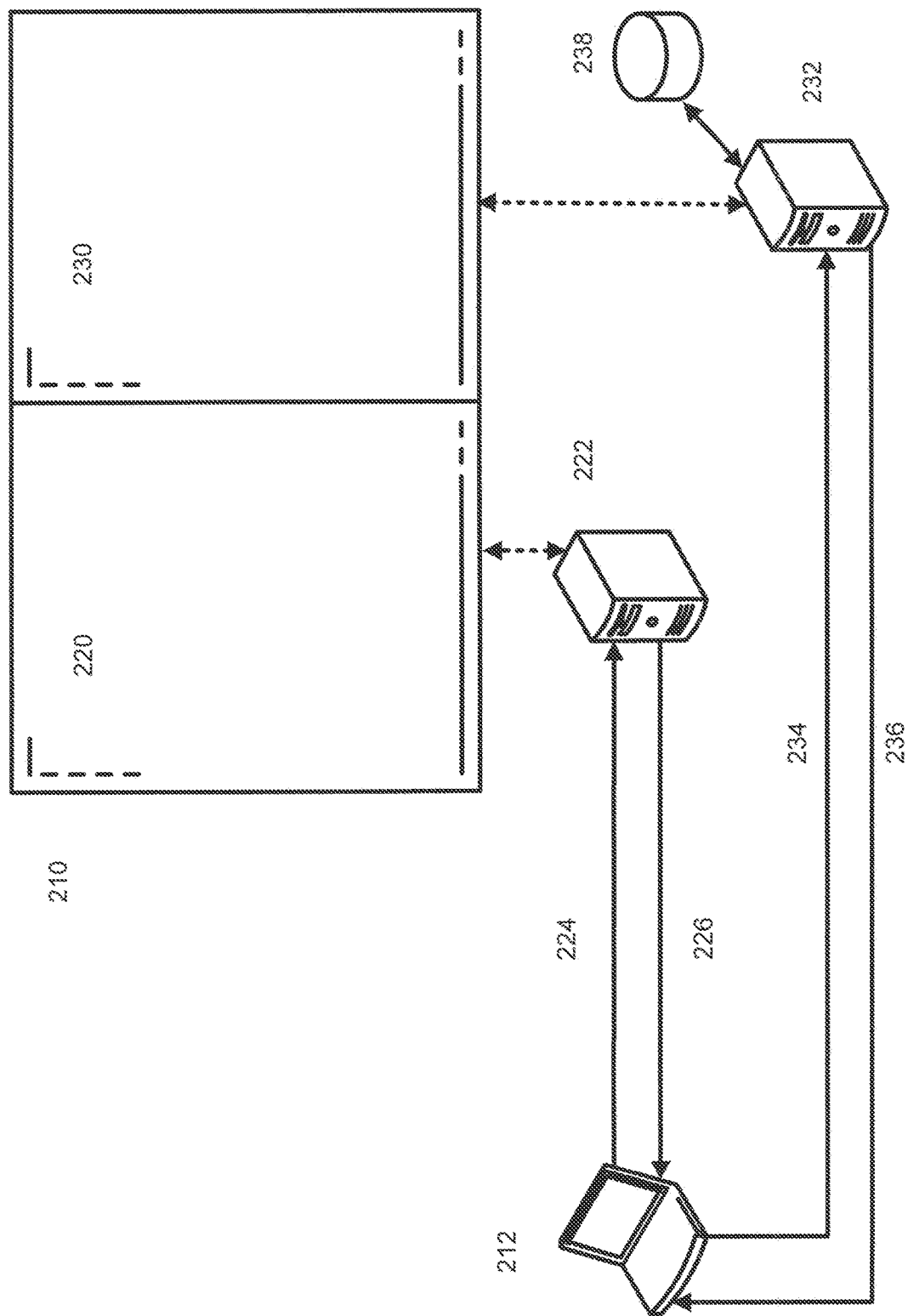
FIG. 2 depicts an exemplary network model according to disclosed embodiments.

Embodiments of the present subject matter allow for the implementation of online purchase functionality on static web-pages, or on other web-pages without relying on the web-server serving the pages being involved in the purchase functionality. For example, as depicted in FIG. 2, a web-page 210 may present content 220 and 230. Content 220 is served by server 222. The web-page 210 also contains API that causes code to be requested from a second server 232, so as to provide content 230. Thus, in the example of e-commerce, the present subject matter may provide for checkout functions that are remote from the first server. That is, the checkout functions may be communicated directly between the client and the second server via the APIs without interaction of the first server. This may also be accomplished in a way that the presentation to the user is maintained without disruption or an appearance of shifting between servers. For example, the content 220 may provide the overall appearance of a web-page. Content 230 may be presented within this frame, and even tailored to match characteristics identified with the first server, in such a way that, as the user interacts with content 230, content 220 is undisturbed.

The interaction between the client and content 230 can include shopping cart functionality, based on communications with a separate vendor, and/or payment transactions involving a third-party payment service. The communication between the second server and the vendors/services can be maintained independent from communications with the first server. Of course, the client, second server, vendor or services may provide specific information to the first server if so desired, or required for a particular transaction. However, such communications are not necessary for the second server to provide the various functionalities described herein.

An HTML document, whether implemented in Standard Generalized Markup Language (SGML) or Extensible Markup Language (XML) or some other serialization typically consists of a number of nested elements or tags. Each tag can be of a different type and can have a number of associated properties.

In many browsers it is possible to programmatically access and edit the HTML document using JavaScript or some other scripting language. Many browsers implement an API allowing JavaScript code to access objects in an HTML page. This API is commonly known as the HTML Document Object Model (DOM). In particular, the API gives access to an object representing the whole document. It is further possible to access child-elements of this object. By recursively accessing the child objects of the document object, it is possible to access and modify any element in the HTML document. It is also possible to add new elements as child elements of an existing element.

JavaScript content can be inserted directly into an HTML document by copying the content of the script into the document and enclosing it in an appropriate element, or by embedding an element in the HTML document with a reference to a separate file containing the script. The reference can be to a script located on an external server.

With further reference to FIG. 2, in embodiments, online purchase functionality may be added to a static web-page, e.g. 210, served from a first web-server 222, by including an element with a reference to JavaScript content located on a second web-server 232 in the page. When a web browser on computer 212 loads the static web-page 210 via exchange 224, 226, it will also load the JavaScript content from the second server 232 via exchange 234, 236, and execute it. This may result in a display element, such as element 230, that is not expressed by the static web-page instructions initially served by first web-server 222. JavaScript content sent from the second server 232 may be dynamically generated at the second server each time a browser requests it, and may be tailored in myriad ways to suit a customer or vendor's needs.

The JavaScript code received from the second web-server 232 in 236 may contain instructions that add online-purchase functionality to the static web-page 210. In embodiments, the code may traverse the elements in the static web-page and change them in order to add online purchase functionality.

Figure 3:
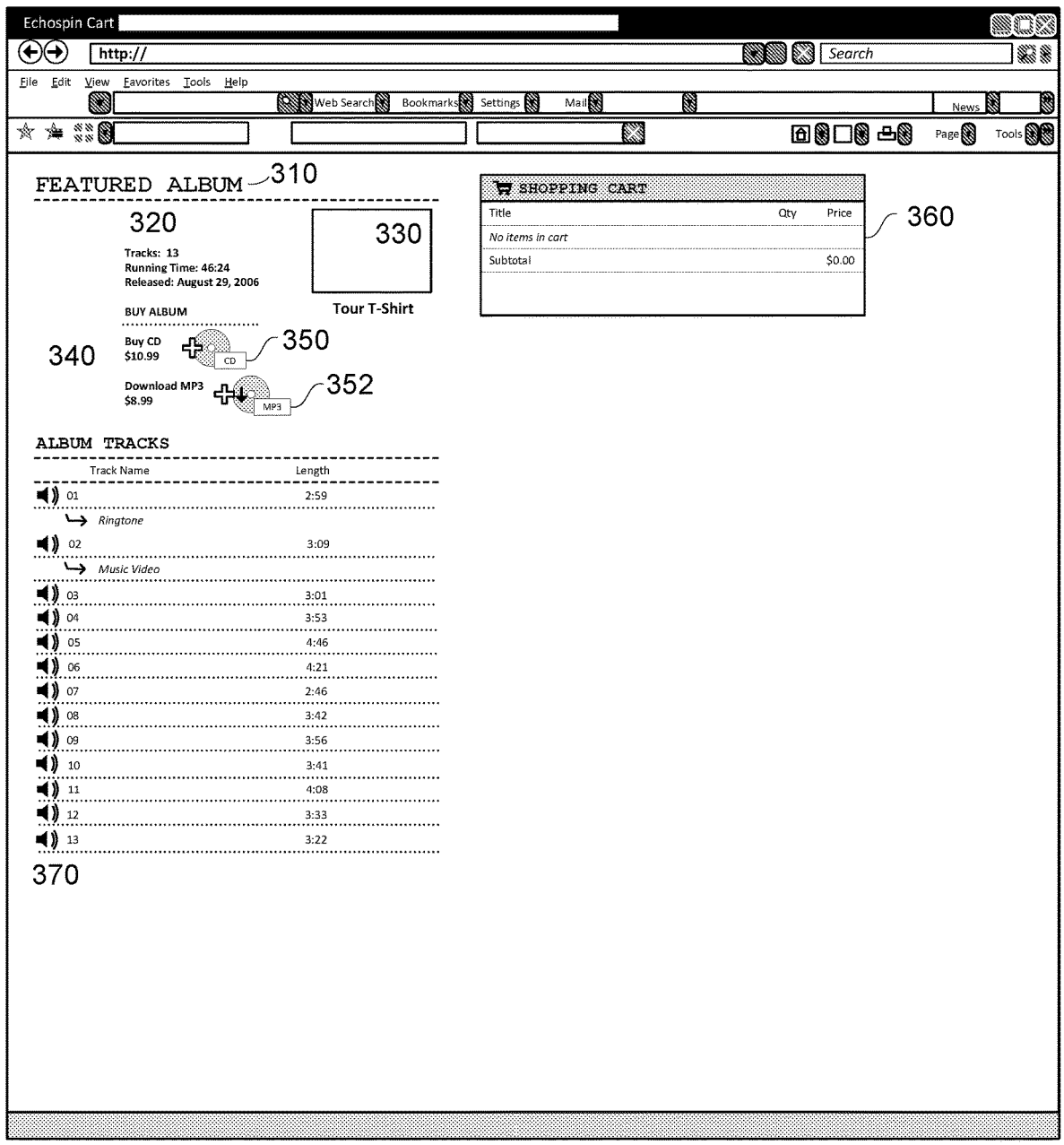
FIG. 3 depicts an exemplary web-page with functionality according to disclosed embodiments.

With reference to FIG. 3, elements on the static page may contain information about a product including, for example, a name, e.g. 310, a title, e.g. 320, a picture, e.g. 330, a price, e.g. 340, stock availability information, a description and buttons, e.g. 350, 352 to add elements to a shopping cart, e.g. 360. The element may also include a code identifying the product in a product database, e.g. 238, accessible to the second web-server. The JavaScript code may verify the information with the second server and update it if it is incorrect. It may also add functionality, such as enabling the functionality of the button.

The JavaScript code may cause further information to be loaded from the second server without re-loading the page. One way of doing this is to cause a script-tag to be added to the static page which causes JavaScript code to be loaded from the second server. The script tag will contain a URL to the script on the second server. The URL may contain a query-string. This query string may contain information about the script to be requested and what information it should include. The query string may for instance include a product reference, and the script to be sent back may include information about the product corresponding to the reference.

Similarly, the script may cause a list of the items a user has added to their shopping cart 360 to be displayed on the static page. The static page may contain an element with an identifier marking it to the script as the place to insert such a list.

In an embodiment of the invention the script uses web browser cookies to keep track of what items the user has added to the shopping cart 360. In this case it is possible to display a list of items in the shopping cart without communicating with the second server. The script may also cause a notification to be sent to the second server whenever a user adds something to the shopping cart such that the server can keep track of what items are in the shopping cart. The server may then send a list of items in the shopping cart to the browser each time the list is presented to the user. With this approach it is possible to track the cases where a visitor adds an item to the shopping cart but does not purchase it.

In embodiments the static page may contain an element marked as the place to insert a checkout form, which the user can utilize to complete the purchase. A form may be inserted into this element once the user clicks a link or a button to purchase the items in the shopping cart. The elements contained in the form may be determined by the items in the shopping cart. The script may query the second web server to determine what elements should be contained in the form. Where the shopping cart only contains items that will be delivered electronically it may be sufficient to collect payment information and an e-mail address. If the cart also contains items that will be shipped physically, the form may also contain elements for collecting a delivery address.

In embodiments, the purchase may be completed by submitting the information in the checkout form to the second web-server. The information in the form may be submitted to the server as a request for a script where the information is contained in the query-string of the URL of the script. A response may be contained in the script that is submitted back to the user. The script may cause a confirmation to be displayed in the user's browser, if the second server was not able to complete the purchase, the script may cause the form to be highlighted such that the user may correct missing or incorrect data.

In embodiments, the first server may also monitor the occurrence of events, such as JavaScript events, in order to add additional code and/or information. Generally, this may include the first server monitoring for occurrence of events between the client and the second server, after the first server provides initial instructions to the client. When the specified event involving the client-second server interaction is detected, the first server may then serve additional information or code. For example, a vendor may desire to provide a client with a reward upon successful completion of a given transaction. The first server can recognize when the identified event occurs, in this case providing the consumer with a receipt/response with confirmed billing information. Such monitoring functions can be included as additional instructions that are served by the first server along with the APIs as disclosed herein. When the identified event is recognized, the first server may provide additional code and/or information to the client, such as code that provides access to a function related to the first server's site. Additionally, the nature and details of the event may be analyzed to determine the appropriate response. For example, if the event reflects the purchase of a particular music album, the vendor may desire to provide the user with access to videos associated with the album. This can be accomplished by the first server recognizing the event, e.g. purchase of the album, and providing code or other information to access online items, e.g. the videos.

As mentioned above, the code and information delivered and/or presented to the user can be customized by the second server based on information received from the client computer and/or the first server. For example, product pricing and availability may vary depending on such factors as where the customer is physically located, what website the customer is accessing, or other special promotions that the customer or vendor May want to implement. Such factors can be considered by the second server by identifying first web-server information, such as a first web-server identity, a first web-server API key, a first web-server URL, first web-server domain, etc. The first web-server information may be included in the static web-page information served to the user, and relayed to the second web-server by the client computer when requesting code and/or information.

Of note, are implementations where the code and/or information provided to the user is tailored in such a way as to mimic the appearance or identity of the first server, or vendor associated with the first server. For example, presentations to the user can be tailored such that shopping carts, receipts, and/or subsequent communications to the user include brand names, images, addresses, and the like, associated with the first server. This functionality can serve several purposes including creating an improved image and apparent capabilities for a small website, or maintaining customer comfort and confidence in dealing with a particular vendor, rather than a third-party. Therefore, embodiments may include where responses called by a particular API may be different depending on the identity of the first server.

Similar determinations and customizations may be made based on consumer information such as, for example, a consumer location, consumer identity, a membership level of a requesting user, and/or a purchase history of a requesting user. Thus, the presentation can be further tailored to the specific individual to whom it is presented.

The system can also dynamically update the correct code or information to provide by taking into account information such as a website that referred the user to the first web-server, items already in a shopping cart of the web-page, and/or the presence of a particular cookie in a web browser that is displaying the web-page.

These various types of functionality may significantly improve the function of the second server delivery, for example, by improving flexibility across wide markets, and customizing the presentation to the user, and the user's circumstances.

In addition to determining pricing and availability for products based on the above factors, embodiments may also use such factors in determining appropriate instructions, such as order instructions. For example, based on known or detected customer, website and/or status information detailed above, certain order instructions may be foreclosed or determined automatically. Thus, as part of the content delivery process, options such as delivery carriers, pricing, etc., can be adjusted on the forms presented to the user.

Embodiments may also include automatically identifying when a mobile device product is added to the shopping cart. When this is the case, the system, e.g, the second server 232, may then automatically request a phone number and a carrier to deliver the relevant product over the air. The system may also identify an appropriate entity for fulfillment of an order from the client. This can take many forms, including, for example, using geolocation of the client, established service agreements, and/or available stock at known providers or shipping locations, e.g, warehouses. The second server 232 may independently access databases and information that may not be readily available or accessible by the first server. This access can provide improvements in the capabilities of unsophisticated, or unaffiliated, independent websites with minimal investment on the part of the independent site. As an added benefit, this improved service can be provided in a way that activities of the second server are transparent to the user, thus maintaining consumer confidence and a seamless browsing experience.

The second server may identify the user and associate the user with permissions that are Pot limited to the first server. This may allow, for example, for a user profile to be used to gain access to content through various websites served by different first servers without providing user information to the first servers. Rather, after accessing portions of the content that are served by the first server, APIs may be used that allow users to identify themselves to the second server, without sharing that information with the first server. Again, this service can greatly reduce the burden and complexity of performing tasks such as authentication at the first server level, and can also provide benefits in user security by relying on a profile that can be applied without providing information from the user to the first server. In embodiments, the second server can authorize code and/or information to pass on to the client or the first server based on the independent authentication of the user.

With further reference to FIG. 3, embodiments may also include wherein the code presents preview functions, such as audio previews 370, and/or video previews. These may be activated without purchasing the relevant item, and can also be controlled to limit the amount of times the previews are accessible from a given client computer, domain, within a given timeframe, or other limitations.

Embodiments may also provide solutions involving the sales and/or distribution of downloadable items that are not available at a particular time. In such circumstances, the second server may provide an authorization code to allow for downloading the item when it becomes available. The second server may also cause an electronic message to be sent to the consumer when the item becomes available for downloading.

Embodiments may also provide for obtaining additional information in ways that are not achievable by conventional systems. For example, from the level of the second server, information regarding a particular user may be obtained as the user browses and engages with websites across different domains. Therefore, a second server, that is not the client's Internet Service Provider (ISP), such as 232, may obtain valuable information that is not available to systems that look, for example, at the traffic of a given website or server such as 102. The gathering of this information may be premised on a session cookie that tracks the client's history across domains, or can be implemented in associated with the APIs that contact the second server as the user accesses various web-pages using those APIs. Thus, a user that accesses a variety of sites having no formal affiliation, and/or are distributed across different internet service regions, can be tracked by the second server that provides APIs to the sites. This tracking function may also provide an easy way for a domain to implement a tracking service with respect to customers, without the complexity of having to host the specific code and function on their site.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for adding functionality to application content served to a client-computer by a first server, the method comprising:
providing API to the application content served by the first server;
at a second server including a microprocessor,
receiving a first request from the client-computer to add purchase functionality to the application content being served by the first server, the first request generated by the API;
generating first client-side code based on the first request, the first client-side code including instructions for adding the purchase functionality to the application content;
sending the first client-side code to the client-computer using the microprocessor, wherein said first client-side code includes instructions configured to present an interface that allows purchase of an item;
receiving a second request from the client-computer, the second request including a product reference for the item;
generating second client-side code based on the second request, the second client-side code including information about the item;
sending the second client-side code to the client-computer using the microprocessor; and
receiving a third request from the client computer, the third request including an instruction to purchase the item and payment information; and
sending third client-side code to the client-computer, the third client-side code including a confirmation of the completion of the purchase and instructions to cause the client-computer to display the confirmation using the microprocessor.

2. The method of claim 1, wherein the second server automatically determines an instruction related to the purchase based on at least one of a first server identity, a first server API key, a first server URL, a first server domain, and a particular cookie in a web browser that is displaying the application content.

3. The method of claim 1, wherein at least one of product pricing and product availability are determined by the second server based on at least one of a first server identity, a first server API key, a first server URL, and a first server domain.

4. The method of claim 1, wherein at least one of product pricing and product availability are determined by the second server based on a particular cookie in a web browser that is displaying the application content.

5. The method of claim 1, wherein the API is provided by an operator of the second server.

6. The method of claim 1, wherein the purchase functionality includes a purchase window that is embedded by the application content presented on the client-computer within other content served by the first server.

7. The method of claim 6, wherein the appearance of the purchase window is based at least in part on information associated with the first server.

8. The method of claim 1, further comprising adding an entry to a log of user activity across different domains based on at least one of receipt of the API-generated requests or a session cookie that tracks the user's history.

9. The method of claim 1, wherein the information about the item includes a price for the item.

10. The method of claim 1, wherein the purchase functionality includes an icon configured to initiate the second request.

11. The method of claim 1, wherein the API is configured to include indicia unique to the first server in the first request, such that responses called by the API may be different depending on the identity of the first server.

12. The method of claim 1, wherein the API is further configured to allow a user of the client-computer to identify themselves to the second server, without sharing that information with the first server.

13. The method of claim 1, wherein at least one of the second client-side code or the third client-side code includes a request for a delivery address for the purchase.

* * * * *